UNITED STATES PATENT OFFICE.

BERT SEABOLDT, OF SALT LAKE CITY, UTAH, ASSIGNOR TO CHESTER THORNE, OF TACOMA, WASHINGTON.

PROCESS OF TREATING SILOXICON TO PRODUCE THEREFROM REFRACTORY ARTICLES, SUCH AS BRICK AND THE RESULTING PRODUCT.

No. 796,459.     Specification of Letters Patent.     Patented Aug. 8, 1905.

Application filed January 6, 1905. Serial No. 239,944.

*To all whom it may concern:*

Be it known that I, BERT SEABOLDT, a citizen of the United States, and a resident of Salt Lake City, in the county of Salt Lake and State of Utah, have invented certain new and useful Improvements in Processes of Treating Siloxicon to Produce Therefrom Refractory Articles, such as Brick, for instance, and in the Resulting Product of such Processes, of which the following is a specification.

Siloxicon, or, as it is sometimes termed, "amorphous carborundum," is a compound of silicon, carbon, and oxygen in chemical combination possessing exceptionally high refractory properties, a process resulting in the production of which has been described in United States Letters Patent No. 723,631, to E. G. Acheson, dated March 24, 1903, and also in Letters Patent No. 492,767, to said Acheson, dated February 28, 1893. Said siloxicon has been heretofore usually produced only in granular form, and it has been a desideratum to mold and secure the same permanently into bodies of various shapes—such, for instance, as bricks for furnace-linings, crucibles, &c., in which its refractory properties might be industrially availed of.

The object of my invention is to provide a process whereby said granular siloxicon may be so molded, treated, and its collective granules so secured together in such forms having as such capacity to remain integral and unaffected under the highest temperatures to which they may be subjected short of that required for the formation of the said compound siloxicon. I attain this object by the following-described process, which, broadly considered, may be described as introducing into the granular mass of siloxicon operated upon additional compounds of such character as to liberate into the mass alkaline and acid or alkaline or acid constituents, which latter under suitable temperatures are thus enabled to act as reducing agents, or fluxes, upon the constituents of the siloxicon at or near the surfaces of each of the respective granules thereof constituting the mass operated upon.

My process preferably involves preliminarily the introduction into the mass of siloxicon granules of compounds capable as ordinary binders of imparting to the mass sufficient cohesion, temporarily, at least, to enable the same to be molded and held in the required forms prior to exposure to the high temperatures requisite to produce the fluxing reactions aforesaid, which will render the cohesion of the siloxicon granules permanent.

I have thus then practiced my novel process as follows, the examples given being merely illustrative and not exclusive of others, which special requirements may develop: to ninety per cent. of siloxicon in granulated state—the granules being, say, preferably of a size adapted to pass through a forty-mesh screen—I have added, reduced to powder as a flux, seven per cent. of No. 1 fire-clay (it being preferable that such clay should contain not less than thirty per cent. alumina and fifty per cent. silica) and about one per cent. of bran or of wheat or oat chaff, also reduced to powder, care being taken that the siloxicon should be in a perfectly dry state. Of these ingredients I have made a thorough mixture dry and have then added thereto as additional flux about two per cent. of salt, chlorid of sodium, in solution with sufficient additional water to produce such consistency in the mass as to enable the same to be readily molded. Since the siloxicon itself will absorb none or very little of the water, care should be exercised in introducing the latter, which should not, preferably, exceed thirty per cent. of the total mixture. The mixture is next thoroughly stirred, so as to completely and as evenly as possible distribute the moisture throughout the mass, when it is ready for molding by any convenient means into the desired forms—as, say, brick, for instance. I have found it, however, preferable in order to obtain a more complete saturation to allow the mixture to remain from twelve to even twenty-four hours in an iron-lined bin or other receptacle adapted to prevent either absorption or evaporation of its moisture from the mixture. In molding ordinary wooden molds may be employed—such as are used, for instance, in the manufacture of ordinary clay brick—and when the molded material is removed from the molds any ordinary drying process may be then employed to expel the moisture from the articles, since it is preferable that practically all of the water added for mixing as aforesaid should then be expelled before the articles are exposed to burning in the kiln. If the molded articles are repressed before loading into the kiln, they will thereby have sufficient tensile strength imparted to them to allow of their being "ricked" to a height of, say, six to eight feet and can be "close-stacked" because of the intense and thorough permeating heat to which they are about to be subjected to flux them, as hereinafter described. When the kiln is loaded, it should be, preferably, preliminarily "smoke-dried" and then sealed and a temperature generated therein sufficiently high to insure decomposition of the fluxing compounds added, as aforesaid, to the siloxicon, which temperature should be maintained for a period of between twenty to thirty hours. The aforesaid temperature required will vary somewhat, according to the composition and nature of the fluxes employed, it being essential only that the temperature shall be sufficiently high to insure their decomposition and the reaction of certain of their constituents as reducing agents upon the surface of the granules of siloxicon. The resulting molded and thus fluxed products of my process will consist, generally speaking, essentially of siloxicon, the granules of which after cooling will be found to adhere to each other with such tenacity as to be substantially inseparable under any temperature to which they may be subjected short of that required for the actual formation of the siloxicon itself. Indeed, my present experience is persuasive to the effect that their coherence will, under ordinary circumstances, continue unimpaired until the articles are subjected to a temperature sufficiently high to produce among the constituents of the siloxicon those reactions requisite to make carborundum crystal.

It seems that the action of the reducing agents apparently liberated from the compounds added to the siloxicon under the high temperatures employed is such as to attack, as fluxes, the surfaces of the granules of siloxicon and there form new chemical compounds with certain of the constituents of the siloxicon, in consequence of which the granules are firmly cemented together. The exact nature of these reactions or their *modus operandi* I am unable at present to disclose with precision, nor do I deem this requisite to an understanding of my invention, the result of which is, as aforesaid, to produce molded articles of siloxicon having the requisite cohesion, as specified. I have found it advisable to change the formulas for my mixtures in the application of my process to meet different requirements, and I have made siloxicon brick, crucibles, and other forms under a variety of different formulas in addition to that already described. I have used, for instance, with success the following formula, viz:

| | |
|---|---|
| Siloxicon | 90 parts, by weight. |
| Sawdust or chaff | 1 part, by weight. |
| Clay { Alumina | 2 parts, by weight. |
| Silica | 3 parts, by weight |
| Ferrous oxid | 1 part, by weight. |
| Magnesia | 2 parts, by weight. |
| Titanic acid and potash | 1 part, by weight. |
| | 100 parts, by weight. |

In the formula last mentioned it will be observed that I omitted the chlorid of sodium, finding that sufficient alkaline and acid reagents were supplied by those contained in the constituents of the clay and of the sawdust or chaff. I have also used successfully the following formula:

| | |
|---|---|
| Siloxicon | 90 to 95 parts, by weight. |
| Clay | 7 to 2 parts, by weight. |
| Silicate of soda | 1 to 1 part, by weight. |
| Salt | 2 to 2 parts, by weight. |
| | 100 to 100 parts, by weight. | and also the following formula:

| | | |
|---|---|---|
| Siloxicon | 90 to 95 | parts, by weight. |
| Clay | 5 to 2 | parts, by weight. |
| Silicate of soda | 1 to 0.50 | part, by weight. |
| Salt | 2 to 1 | parts, by weight. |
| Sawdust or chaff | 2 to 1.50 | parts, by weight. |
| | 100 to 100 | parts, by weight. |

I have also in a few instances substituted sulfur for the sawdust or chaff and in other instances have used sulfur in combination with those materials, reducing in that case proportionately the quantity of some of the other constituents of my mixture.

It will be observed in each instance that one of the effects of the fluxes or some of them added to the siloxicon in the respective mixtures is to impart through volatilization of constituents a certain porosity to the finished article sufficient to preclude the development therein of high pressures from steam or other vapors. Thus certain of the constituents of the clay, notably the alumina, and likewise the sawdust or chaff, being more or less dissipated during the firing, will result in porosity throughout the mass of the finished article, these constituents contributing at the same time some of the alkalies and acids required as fluxes, as aforesaid—for instance, the chaff or bran contributing titanic acid, the salt hydrochloric acid, the sulfur hydrofluoric acid, the silica silicic acid, &c.

I am aware that it has been suggested that siloxicon in powdered state is self-binding and may be molded and burned into coherent refractory masses; but my practice has demonstrated that such is not the case and that siloxicon so treated is not sufficiently coherent for use under the usual high temperatures required for industrial purposes.

I am also aware that it has been suggested that sufficiently coherent masses may be produced by mixing with powdered siloxicon various so-called "binding agents"—such as hydrocarbons, liquid tar, asphaltum, pitch—or carbonaceous materials—such as molasses, glue, &c., or even clay or magnesia—molding the mass and then burning it; but such procedure I do not claim as constituting any part of my invention, which is distinguished therefrom in that it involves the raising of my mixture to a temperature sufficiently high not only to entirely decompose and wholly or in part drive out the compounds added by me to the siloxicon, as aforesaid, but also to enable certain of their constituents during the process to attack, as fluxes, the granules of the siloxicon, whereby requisite coherence is secured. This temperature will vary somewhat, according to the fluxes employed. It should be sufficiently high to insure reaction of constituents of the siloxicon, at least at the surfaces of its granules, with constituents of the added compounds; in other words, sufficiently high to there flux the siloxicon—that is to say, the temperature of my process is much higher than that employed in the burning of clay to produce bricks and also much higher than the temperature developed in the industrial uses—such as furnace-linings, for instance—in which the refractory bodies resulting from my process may be employed. It will also be noted that clay alone added as aforesaid will not satisfactorily produce my product, it being in all cases preferable, as illustrated by the aforesaid formulas, to add also other compounds capable of liberating other acids qualified to act as reducing agents relatively to said siloxicon.

Having thus described my invention, what I claim as new, and desire to secure by Letters Patent, is the following, viz:

1. The process of treating siloxicon to produce therefrom refractory coherent bodies, which consists in mixing with said siloxicon substances competent on decomposition to furnish constituents capable of acting as fluxes relatively to said siloxicon, and raising the mixture to a temperature sufficiently high to decompose said substances and to flux said siloxicon.

2. The process of treating siloxicon to produce therefrom refractory coherent bodies, which consists in mixing with said siloxicon substances competent on decomposition to furnish constituents capable of acting as fluxes relatively to said siloxicon and raising the mixture to a temperature sufficiently high to decompose said substances, to eliminate by volatilization constituents of said substances, and to flux some of said siloxicon by reactions set up between its constituents and the remaining constituents of said substances.

3. As a new article of manufacture a refractory coherent body consisting substantially of siloxicon granules and fluxed siloxicon.

4. As a new article of manufacture a refractory coherent body consisting substantially of siloxicon granules fluxed together.

5. The process of treating siloxicon to produce therefrom refractory coherent bodies, which consists in mixing, with such siloxicon, compounds containing alkaline and acid constituents, raising the mixture to a temperature insufficient to crystallize said siloxicon but sufficient to reduce said added compounds and liberate in the mass their alkaline and acid constituents, and further raising the temperature to a point at which said liberated acid and alkaline constituents behave as fluxes relatively to said siloxicon, whereby some of said siloxicon is fluxed and coherence imparted to the mass without crystallizing said siloxicon.

BERT SEABOLDT.

Witnesses:
WALTER D. EDMONDS,
PHILIP C. PECK.